United States Patent [19]
Naito

[11] Patent Number: 5,331,259
[45] Date of Patent: Jul. 19, 1994

[54] BRUSHLESS MOTOR DRIVE CIRCUIT

[75] Inventor: Hayato Naito, Nagano, Japan

[73] Assignee: Sankyo Seiki Mfg. Co., Ltd., Nagano, Japan

[21] Appl. No.: 861,813

[22] PCT Filed: Oct. 9, 1991

[86] PCT No.: PCT/JP91/01378
§ 371 Date: Jul. 13, 1992
§ 102(e) Date: Jul. 13, 1992

[87] PCT Pub. No.: WO92/07420
PCT Pub. Date: Apr. 30, 1992

[30] Foreign Application Priority Data
Oct. 12, 1990 [JP] Japan .................. 2-274924

[51] Int. Cl.$^5$ .............................................. G05F 3/16
[52] U.S. Cl. ...................... 318/254; 318/138; 323/314
[58] Field of Search ............... 318/254, 138, 439, 459; 323/901, 314, 312; 363/62

[56] References Cited
U.S. PATENT DOCUMENTS

| | | | |
|---|---|---|---|
| 4,227,127 | 10/1980 | Fukaya et al. | 318/459 |
| 4,428,040 | 1/1984 | Yamashiro et al. | 363/62 |
| 4,608,524 | 8/1986 | Yokobori | 318/439 |
| 4,742,281 | 5/1988 | Nakano et al. | 323/901 |
| 4,751,463 | 6/1989 | Higgs et al. | 323/314 |
| 4,987,352 | 1/1991 | Ishii | 318/254 |

FOREIGN PATENT DOCUMENTS 5980179 6/1954 Japan .
58151888 4/1983 Japan .

Primary Examiner—William M. Shoop, Jr.
Assistant Examiner—John W. Cabeca
Attorney, Agent, or Firm—McAulay Fisher Nissen Goldberg & Kiel

[57] ABSTRACT

A brushless motor drive circuit supplies power to a brushless motor by soft switching and prevents saturation of power supply transistors under any conditions. The brushless motor drive circuit includes, for respective phases, a first set of transistors for driving output transistors connected to the side of a DC power supply; a second set of transistors which constitute current mirror circuits in combination with the first set, respectively; a reference voltage generating device is connected to the second set of transistors respectively, for generating voltages proportional to currents flowing in the second set. A current feedback circuit, which, when potential differences between the inputs and outputs of the first set of transistors reach values close to the voltages generated by the reference voltage device, are turned on, causing voltage drops nearly equal to voltages generated by the second set of transistors, so as to partly feed back output currents of the first set of transistors to stages preceding the reference voltage generating device so that input currents to the first transistor are reduced. This results in an avoidance of saturation of the output transistors and also avoids the adverse reliance on circuit values.

7 Claims, 3 Drawing Sheets

BRUSHLESS MOTOR DRIVE CIRCUIT

TECHNICAL FIELD

The present invention relates to a brushless drive circuit which supplies a power to a brushless motor while switching the power supply to the driving coils of the motor in the respective phases in a sequential order by what is called a soft switching technique which employs smooth or rounded coil driving waveforms. More particularly, the invention pertains to a circuit for preventing saturation of output transistors which are used to switch the power supply to the driving coils of the brushless motor.

BACKGROUND ART

There has been proposed a brushless motor drive circuit of the type supplying a power to the brushless motor by applying to the driving coils of motor driving current waveform with dulled or rounded inflection points, in the respective phases, in an attempt to reduce a noise generation caused by abrupt or acute changes in driving current waveform due to the inherit abrupt power-supply switching in each driving coil. However, with such drive circuit, when a power transistor becomes saturated upon starting a motor or during its uncontrolled drive, the switching waveform (i.e. the driving current waveform applied to each driving coil) is distorted or becomes unsmooth, resulting in lowering its motor noise reduction effect.

One possible technique that has been proposed to solve this problem is a technique for detecting the state of the power transistor which is about to be saturated and limiting a control current so as to limit power supply to the transistor, thereby preventing saturation. This technique is disclosed in Japanese Patent Laid-Open Gazette No. 56188/88 of a patent application filed in the name of the applicant of the present application. Referring now to FIG. 6, a brief explanation will be made thereof.

In FIG. 6, the power supply to three-phase driving coils $L_1$, $L_2$, and $L_3$ is controlled by power transistors Qa, Qb, Qc, Qd, Qe and Qf via a pre-driver 2. The pre-driver 2 combines together or synthesizes rotor position sensed signals from position sensors (not shown) into a 120° switching signal which supplies power for a 120° period in a 180° interval or zone, thereby dulling or rounding this signal waveform at its inflection points to obtain a soft switching waveform, which is used to control each of the transistors Qa to Qf, effecting a power supply control for each of the driving coils $L_1$ to $L_3$.

The current to each of the driving coils $L_1$ to $L_3$ flows into a current detecting resistor Re, which generates a voltage proportional to the incoming current, and the voltage is applied to an inverting input of a current feedback amplifier Af. On the other hand, when a current flows to a resistor Ra via a transistor Qg, a voltage proportional to this current is induced in the resistor Ra and is applied to a non-inverting input of the amplifier Af. A control amplifier Ac amplifies a difference between a control reference voltage Vref, defined by the ratio between resistors Rc and Rd, and a control signal voltage Vctl, to provide a control current Ictl. The control current Ictl flows to the ground via a resistor Rb and a transistor Qj and, at the same time, defines a current which flows in the collector of a transistor Qh via the base of a transistor Qi, and in accordance with this collector current, the base current of a transistor Qg is controlled to thereby determine the above-mentioned current Ictl which is the collector current of the transistor Qg. The control current Ictl of the control amplifier Ac is set such that it will ultimately become equal to the current Ictl which flows in the resistor Ra.

Diodes Da, Db and Dc have their cathodes connected to the driving coils $L_1$, $L_2$ and $L_3$, respectively, and have their anodes all connected to an output terminal of the control amplifier Ac.

Now, let is be assumed that the motor is placed under constant speed control. If the rotational speed of the motor decreases, the control voltage Vctl will be raised to increase the speed and also the control current Ictl will go up, causing an increase in the voltage of the resistor Ra. When the voltage of the resistor Ra becomes higher than that of resistor Re, the current feedback amplifier Af will, via the pre-driver 2, raise the base currents of the transistors Qa to Qf to enlarge the amplitudes of the voltages which are applied to the driving coils $L_1$, $L_2$ and $L_3$, thereby making higher the coil driving currents for speed-up of the motor. In the event of the motor speed increasing excessively, it is decreased by reversing the above-said procedure. In this way, the rotational speed of the motor is held at a fixed value.

Next, a description will be given of operations at the start of the motor and during its uncontrolled running. When the control voltage Vctl increases and the control current Ictl also increases correspondingly at the start of the motor and during its uncontrolled running, the amplitude of the coil driving voltage increases and the minimum voltage of each driving coil drops. If the minimum voltage of the coil drops down to a minimum voltage value, or, Rb·Ictl, a portion of the control current Ictl flows in any one of the transistors Qd, Qe and Qf via the diode Da, Db or Dc. In consequence, the increase of the control current Ictl is not transmitted to the current feedback amplifier Af and the minimum voltage of the coil will no longer fall.

As shown in FIG. 7, the driving coil voltage varies up and down by the same amplitude, about Vcc/2. If maximum and minimum values of the driving coil voltage are sufficiently different from a DC power supply voltage Vcc and the ground potential GND, respectively, the waveform of the driving coil voltage will become a 120° soft switching waveform having dulled inflection points. If, however, the maximum and minimum values of the driving coil voltage are close to the DC power supply voltage Vcc and the ground potential GND, the waveform of the driving coil voltage will become a 180° soft switching waveform as indicated by the broken lines in FIG. 7, which causes vibration in the driving coil and also impairs the motor efficiency. Yet, according to the prior art example depicted in FIG. 6, the coil voltage will not reach the power supply voltage Vcc and the ground potential GND and the power transistors Qa through Qf will operate unsaturated; hence, it is possible to attain the intended object of preventing saturation.

In general, however, the saturation voltage of a transistor varies with its collector current and ambient temperature and is influenced by the rating of the transistor itself as well, and accordingly it is very difficult to accurately detect the saturation of the transistor under whatever conditions. According to the prior art example shown in FIG. 6, since terminal voltages of the diodes Da, Db and Dc are uniformly used to detect the saturation of the power transistors Qa to Qf, such situation occasionally arises where the transistors are not sufficiently kept from saturation or the saturation preventing effect is produced so much that the power supply cannot efficiently be utilized. Moreover, since the saturation preventing effect is influenced by the value of the resistor Re for motor current detection use as well, the value of the resistor Re must be fixed, hence excluding any desired designability in the circuit. Besides, spikes in the voltage waveform, which are produced when the power supply is switched to each coil, cause malfunction of the saturation preventive circuit and cut off the motor current momentarily, resulting in lower torque and speed of the motor and a noisy motor operation.

OBJECT AND SUMMARY OF THE INVENTION

It is an object of the present invention to provide a brushless motor drive circuit which permits accurate detection of saturation of power transistors under whatever conditions and ensures the prevent of saturation of the transistors without being influenced by a value of the resistor Re and spike voltage phenomenon mentioned above.

To attain this object, according to the present invention, in a brushless motor drive circuit which includes a plurality of output transistors for switching the power supply to m-phase driving coils, there are provided, for each phase, a first transistor for driving the corresponding one of the output transistors connected to the DC power supply side; a second transistor which constitutes a current Miller circuit in combination with the first transistor; a reference voltage generating means connected to the second transistor, the means being for generating a voltage proportional to a current flowing in the second transistor; and a current feedback means which is to be turned on when a potential difference between an output terminal of the first transistor and the DC power supply reaches a value close to the voltage generated by the reference voltage generating means, while at the same time the current feedback means causes a voltage drop nearly equal to a voltage generated by the second transistor, to thereby feed back a portion of an output current of the first transistor to a stage preceding the reference voltage generating means, so that an input current to the first transistor is reduced. It is preferable, in this case, to use a resistor or transistor as the reference voltage generating means, and also to use a transistor or diode as the current feedback means.

With such a circuit arrangement, there is produced in the reference voltage generating means a voltage which is proportional to the current flowing in the second transistor. When the first transistor approaches a saturation state and a potential difference between the output terminal of the first transistor and the DC power supply becomes close to the voltage generated by the reference voltage generating means, then the current feedback means is energized or conducts, causing a voltage drop substantially equal to the voltage generated by the reference voltage generating means, and feeds back a portion of the output current from the first transistor to a stage preceding the reference voltage generating means, thus preventing the first transistor from saturation.

On this account, even if various conditions occur, such as change of the output coil current and ambient temperature, the saturation of the transistor can be detected with a high degree of accuracy at all times, and accordingly the saturation of the transistor in the brushless motor drive circuit can be prevented, providing a stable and efficient motor of good performance.

Additionally, the brushless motor drive circuit in the present invention is provided with a coil midrange voltage detector for detecting a coil midrange voltage, i.e., a midrange voltage between both terminal voltages of a coil, which detector is connected with the driving coils of the motor in the respective phases, and a midrange feedback amplifier for feeding back and bringing the coil midrange voltage in a level equal to a reference coil midrange voltage.

Hence, the detection of saturation of the output transistors is entirely free from any influence of the value of the motor current detecting resistor. In addition, a coil midrange voltage feedback loop may be formed, with the coil midrange reference voltage being grounded in common with emitter of a power transistor on the grounding side in order to keep the saturation preventing effect free from influence of the value of the motor current detecting resistor. Also, the motor current detecting resistor does not need to be fixed in resistance value, allowing removing certain restrictions in designing the circuit.

In one aspect of the invention, the saturation is not detected at the output terminal of each driving coil, thus eliminating the possibility that a saturation detector circuit will malfunction due to spike voltages produced in switching the power supply to each driving coil, whereby the motor performance is not damaged.

In another aspect of the invention, a circuit to be added for applying the present invention to the conventional brushless motor drive circuit is very simple in construction, and economical to construct. Further, fabricating the circuit in an integrated circuit (IC) will aid in reducing the costs involved in assemblage.

For a better understanding of the present invention, reference is made to the following description and accompanying drawings while the scope of the invention will be pointed out in the appended claims.

DETAILED DESCRIPTION OF THE INVENTION

Figure 1:
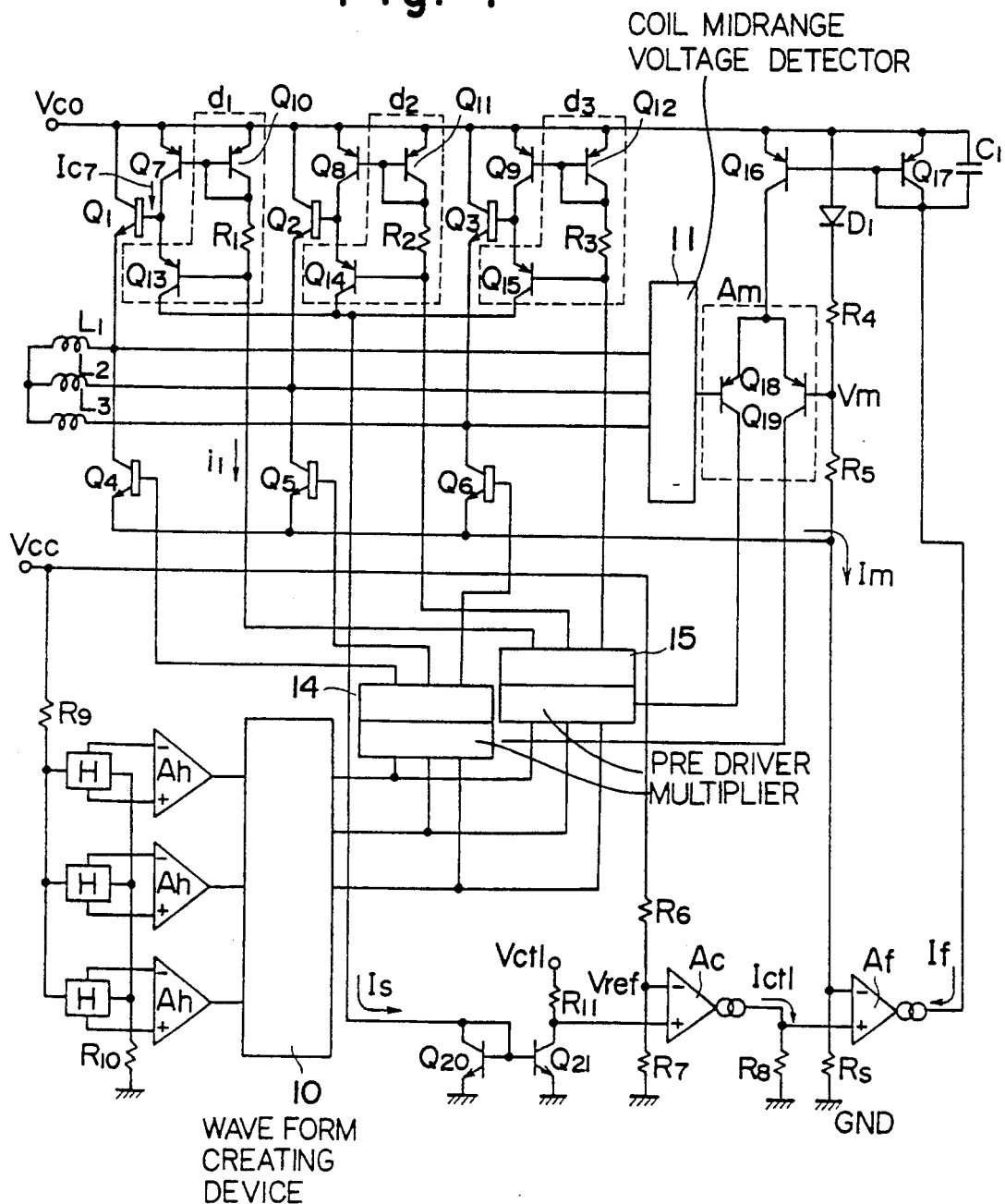
FIG. 1 is a circuit diagram illustrating an embodiment of the brushless motor drive circuit according to the present invention.

The construction of the present invention will hereinafter be described in detail with reference to its embodiment shown in the drawings. This embodiment will be described as being applied to a drive circuit for a three-phase brushless motor (not shown).

In FIG. 1, the DC power supply Vcc is connected via resistor $R_9$ to Hall elements H, H, H disposed correspondingly to the respective three phases of motor. The Hall elements H, H, H are each adapted to respond to the magnetic field of a rotor magnet (not shown) in the motor and then detect a position of rotor to output a rotor position signal. The output signals from the Hall elements H, H, H are waveform shaped by Hall amplifiers Ah, Ah, Ah and then combined together by a 120° soft switching waveform creating device 10 into 120° soft switching waveforms for controlling the power supply to driving coils of the brushless motor. Reference character $R_{10}$ denotes a pull-down resistor for stabilizing the output voltages of time Hall elements H, H, H.

The power supply to the motor driving coils $L_1$, $L_2$ and $L_3$ of the three-phase structure is switched every 120° by ON-OFF control of power transistors $Q_1$ to $Q_6$ which is effected on the basis of the above-mentioned switching waveforms. By this, a rotor (not shown) is driven. The power transistors $Q_1$, $Q_2$ and $Q_3$ are those on the side of a DC power supply Vco, whereas the transistors $Q_4$, $Q_5$ and $Q_6$ are on the grounding side GND. In this embodiment, the transistors $Q_1$ through $Q_6$ are all NPN type transistors. The transistors $Q_1$, $Q_2$ and $Q_3$ on the side of the DC power supply Vco provide coil driving currents when collector currents of PNP type transistors $Q_7$, $Q_8$ and $Q_9$, which serve as pre-drivers, flow in the bases of the transistors $Q_1$, $Q_2$ and $Q_3$, respectively.

It is noted here that, when the transistors $Q_7$, $Q_8$ and $Q_9$ become saturated, the soft switching function will not work well, thus impairing the smooth or moderate switching of power supply to the respective coils and resulting in the motor emitting undesired noises. To avoid this, saturation detector circuits $d_1$, $d_2$ and $d_3$ are each provided for one phase to detect the saturation of the foregoing transistors $Q_7$, $Q_8$ and $Q_9$ and their output currents are partly fed back so that their input currents decrease, thereby preventing the saturation of the transistors $Q_7$, $Q_8$ and $Q_9$.

Now, the construction of the saturation detector circuit $d_1$ will be described, since the saturation detector circuit $d_1$, $d_2$ and $d_3$ are all identical in construction. Assume that the transistor $Q_7$ is a first transistor. There is provided a second PNP transistor $Q_{10}$ which constitutes a current mirror circuit in combination with the first transistor $Q_7$. Connected to the second transistor $Q_{10}$, is a resistor $R_1$ which serves as a reference voltage generating means which generates a voltage proportional to a current $i_1$ flowing in the second transistor $Q_{10}$. A PNP type transistor $Q_{13}$, which acts as a current feedback means, is connected in series to the first transistor $Q_7$. Hence, the emitter of the transistor $Q_{13}$ is connected to the collector of the transistor $Q_7$. Further, the emitter of the transistor $Q_{13}$ is connected to the base of the transistor $Q_1$. The base of the transistor $Q_{13}$ is connected to a terminal of the resistor $R_1$ on the side opposite from the transistor $Q_{10}$. With such a construction, if the potential difference between the output terminal of first transistor $Q_7$ and the DC power supply Vco; in other words, the emitter-to-collector voltage of transistor $Q_7$ becomes close to a voltage $R_1 \cdot i_1$ which is induced in the resistor $R_1$, then the transistor $Q_{13}$ will allow current flow, causing a voltage drop by a level substantially equal to the voltage generated by the second transistor $Q_{10}$.

In the other saturation detector circuits $d_2$ and $d_3$, PNP type transistors $Q_{11}$ and $Q_{12}$ correspond to $Q_{10}$ in the saturation detector circuit $d_1$, PNP type transistors $Q_{14}$ and $Q_{15}$ correspond to $Q_{13}$, and resistors $R_2$ and $R_3$ correspond to $R_1$. A saturation detected current Is, which is provided when the transistors $Q_{13}$, $Q_{14}$ and $Q_{15}$ are turned ON, is applied to a current mirror circuit formed by transistors $Q_{20}$ and $Q_{21}$. To the output side of such current mirror circuit, the control voltage Vctl is being supplied via a resistor $R_{11}$. When supplied with the saturation detected current Is, the mirror circuit suppresses the control voltage Vctl which is applied to the plus side of control amplifier Ac. The control amplifier Ac compares the control voltage Vctl with the reference voltage Vref, with such an arrangement that, if the control voltage Vctl is suppressed, a corresponding amount of control current Ictl, i.e. a corresponding output current, will be suppressed. Reference characters $R_6$ and $R_7$ indicate voltage dividing resistors for creating the reference voltage in that control amplifier Ac or, a comparator in this context. The control current Ictl flows in a resistor $R_8$, and the latter $R_8$ in turn generates a voltage proportional to the former Ictl. The output voltage of the resistor $R_8$ is applied to the current feedback amplifier Af, in which the voltage is compared with a voltage of a resistor Rs which is dependent on a motor current Im, and when the voltage of resistor $R_8$ is suppressed, the feedback amplifier Af suppresses its output current If correspondingly. The output current If flows in a current mirror circuit formed by transistors $Q_{16}$ and $Q_{17}$, and there from, a current substantially equal to the current If flowing in a midrange feedback amplifier Am. The midrange feedback amplifier Am is made up of two symmetrically connected transistors $Q_{18}$ and $Q_{19}$ and forms a differential amplifier. The transistor $Q_{18}$ is supplied at its base with a detected output from a coil midrange voltage detector 11. The current in the transistor $Q_{18}$ flows in a pre-driver/multiplier 15. The pre-driver/multiplier 15 multiplies the above mentioned input current and 120° soft switching waveforms from the 120° soft switching waveform creating device 10 to obtain driving currents, which are applied to the first transistors $Q_7$, $Q_8$ and $Q_9$ to drive them, so that transistors $Q_1$, $Q_2$ and $Q_3$ on the DC power supply side are driven. Diode $D_1$ and three resistors $R_4$, $R_5$, Rs are connected together in series between the DC power supply Vco and ground GND. A voltage at the connection point between the resistors $R_4$ and $R_5$ is applied to the base of foregoing transistor $Q_{19}$ as a reference voltage Vm for midrange voltage in the driving coils. The current in the transistor $Q_{19}$ flows in a pre-driver/multiplier 14, which multiplies the input current and the 120° soft switching waveforms from the waveform creating device 10 to obtain driving currents to drive the ground-side transistors $Q_4$, $Q_5$ and $Q_6$ by the multiplied outputs.

Next, a description will be given of the operation of the embodiment depicted in FIG. 1.

The control voltage Vctl is compared by the control amplifier Ac with the reference control voltage Vref, and the control current Ictl proportional to the difference voltage is output from the control amplifier Ac. The control current Ictl flows across the resistor $R_8$, and the voltage induced therein in proportion to the control current Ictl is compared by the current feedback amplifier Af with the voltage induced in the resistor Rs. When the output voltage of the resistor $R_8$ is higher than the voltage of the resistor Rs even slightly, the amplifier Af absorbs the current If at its output side. The current If is applied as a bias current to the midrange feedback amplifier Am via the current mirror circuit composed of the transistors $Q_{16}$ and $Q_{17}$. The output from the amplifier Am is provided to both of the two pre-drivers/multipliers 14 and 15.

The 120° soft switching waveform signals, which are formed by the waveform creating device 10, are input into those pre-driver/multipliers 14 and 15. In the pre-driver/multiplier 15, drive signals for the power transistors $Q_1$, $Q_2$ and $Q_3$ on the DC power supply Vco side are selected and multiplied by the collector output of the transistor $Q_{18}$ of the amplifier Am. On the other hand, in the pre-driver/multiplier 14 drive, signals for the power transistors $Q_4$, $Q_5$ and $Q_6$ on the ground GND side are selected and multiplied by the collector output of the transistor $Q_{19}$ of the amplifier Am. The outputs obtained by those multiplications are amplified by the pre-drivers of the same elements 14 and 15, respectively. The thus-amplified outputs are transmitted to the power transistors $Q_1$, $Q_2$, $Q_3$, $Q_4$, $Q_5$ and $Q_6$ of the final stage, whereby drive currents are applied to the driving coils $L_1$, $L_2$ and $L_3$ of three-phase structure, in order to drive the motor.

When the motor is being driven, the motor current Im flows in the resistor Rs, which converts it to a voltage proportional thereto. A current feedback loop is formed by controlling the current If with the amplifier Af, so that the voltage in the resistor Rs is always substantially equal to the voltage of the resistor $R_8$. A capacitor $C_1$ connected in parallel to the transistor $Q_{17}$ serves to compensate for the phase of the current feedback loop.

As mentioned previously, the coil midrange reference voltage Vm is applied to the base of the transistor $Q_{19}$ which forms one input terminal of the same feedback amplifier Am. A detected output from the coil midrange voltage detector 11 is applied to the base of transistor $Q_{18}$ forming another input terminal of the midrange feedback amplifier Am. The midrange feedback amplifier Am controls the collector current ratio between the transistors $Q_{18}$ and $Q_{19}$ such as to keep placing in a nearly equal level with the reference voltage Vm, a coil midrange potential In the driving coils which is detected by the detector 11. This costitutes a coil midrange feedback loop. Now, letting a forward voltage drop across the diode $D_1$ be represented by Vf, the coil midrange reference voltage Vm is expressed by the following equation;

$$Vm = (Vco - Vf + Im \cdot Rs)/2 \qquad (4\text{-}1)$$

In FIG. 1, the transistors $Q_7$, $Q_8$ and $Q_9$ form pre-drivers for the power transistors $Q_1$, $Q_2$ and $Q_3$ on the DC power supply side for the driving coils of the respective phases. When the transistors $Q_7$, $Q_8$ and $Q_9$ become saturated at the start of the motor or during its uncontrolled running, the 120° soft switching waveforms are distorted, resulting in the disadvantage of noisy motor operation. In the illustrated embodiment, saturation detector circuits $d_1$, $d_2$ and $d_3$ are provided for the transistors $Q_7$, $Q_8$ and $Q_9$ to prevent saturation of the respective transistors. Since the saturation detector circuits are all identical in their principles of operation, a description will be given of only the saturation detector circuit $d_1$.

Now, consider the timing at which the motor current Im flows via a rout [Vco—$Q_1$—$L_1$—$L_2$—$Q_5$—Rs—GND]. When the control voltage Vctl goes up in excess of the reference voltage Vref, the control current Ictl increases and the voltage of the resistor Rs also increases. In consequence, the current If is raised by the action of the current feedback loop, so that the motor current Im is increased, and the voltage of the resistor Rs is also raised. If, however, the voltage Vco is regarded as a fixed voltage, then the increase of the motor current Im is limited under the influence of counter-electromotive forces or DC resistance components which are produced in the driving coils $L_1$ and $L_2$, and at such instance the increase in the voltage of resistor Rs stops. In general, the current Im reaches its limit earlier than the control current Ictl does. Now, suppose that the saturation detector circuit $d_1$ does not include the transistor $Q_{13}$, the voltage of resistor Rs will not follow the increase in voltage of the resistor $R_8$ resulting from the increase of the control voltage Vctl, and therefore the amplifier Af will abruptly raise the current If. Consequently, in that case, excessive base currents are applied to the transistors $Q_7$ and $Q_5$, which are thereby supersaturated. In other words, the point at which the motor current Im reaches the limit and the voltage of resistor Rs no longer follows the voltage of resistor $R_8$ is a saturation starting point of the transistor $Q_7$ ($Q_5$). In view of this, saturation of the transistor $Q_7$ ($Q_5$) is prevented by conducting the transistor $Q_{13}$ of the saturation detector circuit $d_1$ in the vicinity of the saturation starting point to input the saturation detected current Is to the plus side of the control amplifier Ac via the current Miller circuit formed by the transistors $Q_{20}$ and $Q_{21}$. The transistor $Q_{13}$ operates mainly at the start of the motor or during its free running operation for which no speed control is effected.

This operation will hereinbelow be described in more detail.

Letting the input current to the saturation detector circuit $d_1$ and the base-emitter voltage of the transistor $Q_{10}$ be represented by $i_1$ and $Vbe_{10}$, respectively, the base potential $Vb_{13}$ of the transistor $Q_{13}$ is expressed by the following equation:

$$Vb_{13} = Vco - Vbe_{10} - i_1 R_1 \qquad (4\text{-}2)$$

Further, letting the collector-emitter voltage of the transistor $Q_7$ be represented by $Vce_7$, the emitter potential $Ve_{13}$ of the transistor $Q_{13}$ is given as follows:

$$Ve_{13} = Vco - Vce_7 \qquad (4\text{-}3)$$

From the foregoing equations, (4-2) and (4-3), the base-emitter voltage $Vbe_{13}$ of the transistor $Q_{13}$ is obtained as follows:

$$\begin{aligned} Vbe_{13} &= Ve_{13} - Vb_{13} \\ &= (Vco - Vce_7) - (Vco - Vbe_{10} - i_1 R_1) \\ &= Vbe_{10} + i_1 R_1 - Vce_7 \end{aligned} \qquad (4\text{-}4)$$

If the input current $i_1$ goes up, then the portion, $Vbe_{10} + i_1 R_1$ in the Eq. (4-4), shows increased values, whereupon the motor current Im is increased, while the collector-emitter voltage $Vce_7$ of the transistor $Q_7$ decreases. As a result, the base-emitter voltage $Vbe_{13}$ reaches a transistor turn-ON voltage in a short time and turns ON the transistor $Q_{13}$, through which a portion of the collector current of transistor $Q_7$ is provided as the saturation detected current Is to the current mirror circuit formed by the transistors $Q_{20}$ and $Q_{21}$. The output current from the current mirror circuit flows in the resistor $R_{11}$, and due to a voltage drop across that resistor, the input to the plus side of the control amplifier Ac is decreased lower than the control voltage Vctl. With the above-described operation, even if the control voltage Vctl is further increased, the values of the currents $Ict_1$, If, $i_1$ and Im will not increase and the collector-emitter voltage $Vce_7$ will not decrease any more, thereby ensuring the prevention of saturation of the transistor $Q_7$. The collector-emitter voltage $Vce_7$ at this moment is obtained, using the equation, (4-4) as follows:

$$Vce_7 = Vbe_{10} + i_1 R_1 - Vbe_{13} \quad (4\text{-}5)$$

Here, since the transistor $Q_{13}$ is in the ON state, if the voltages $Vbe_{10}$ and $Vbe_{13}$ are cancelled on the assumption that they are nearly equal to each other, the above equation becomes as follows $$Vce_7 = i_1 R_1 \quad (4\text{-}6)$$

Figure 2:
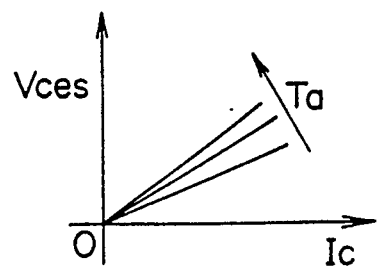
FIG. 2 is a graph showing the temperature dependence of saturation characteristics of transistors.

On the other hand, a transistor saturation voltage Vces generally has a characteristic as shown in FIG. 2. The saturation voltage Vces is proportional to the collector current Ic and its proportional constant has a positive temperature characteristic. Letting the proportional constant be represented by K, the saturation voltage Vces is given as follows:

$$Vces = KIc \quad (4\text{-}7)$$

Rewriting this equation (4-7) in connection with the transistor $Q_7$ results in the following:

$$Vces_7 = K_7 IC_7 \quad (4\text{-}8)$$

In the case of setting the minimum value of the collector-emitter voltage $Vce_7$ to the very limit of the saturation voltage, the voltage $Vce_7$ needs to be set equal to the saturation voltage $Vces_7$ in Eqs. (4-6) and (4-8), from which the following equation is obtained:

$$K_7 Ic_7 = i_1 R_1 \quad R_1 = K_7(Ic_7/i_1) \quad (4\text{-}9)$$

The ratio $Ic_7/i_1$ in Eq. (4-9) is the input/output current ratio of the current mirror circuit formed by the transistors $Q_{10}$ and $Q_7$. This ratio may be regarded as fixed constant. Accordingly, if absolute value and temperature coefficient are found in regard to the proportional constant $K_7$, it is possible to determine a value of the resistor $R_1$ to be set and complete a highly accurate saturation preventing circuit for the transistor $Q_7$.

Next, a description will be given of the prevention of saturation of the power transistor $Q_5$ on the ground side.

Assuming that the resistor $R_1$ in the saturation detector circuit $d_1$ is set at such a resistance value that causes the collector-emitter voltage of transistor $Q_7$ to become the saturation voltage $Vces_7$, the collector-emitter voltage $Vce_5$ of transistor $Q_5$ is obtained as below.

Figure 3:
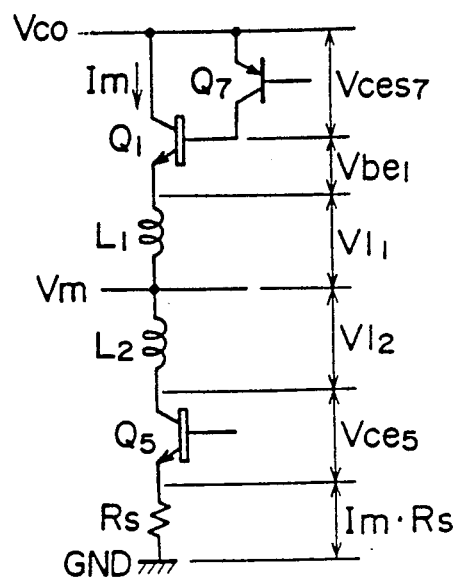
FIG. 3 is a circuit diagram, showing a part of FIG. 1, for explaining an operation for preventing saturation of groundside power transistors in the FIG. 1 embodiment.

Letting the base-emitter voltage of the transistor $Q_1$ be represented by $Vbe_1$ and letting voltages of the driving coils $L_1$ and $L_2$ be represented by $Vl_1$ and $Vl_2$, respectively, as shown in FIG. 3, the following equations can be obtained:

$$Vl_1 = Vco - Vm - Vces_7 - Vbe_1 \quad (4\text{-}10)$$

$$Vl_2 = Vm - Vce_5 - Im \cdot Rs \quad (4\text{-}11)$$

The coil midrange voltage is retained at Vm by the midrange feedback amplifier Am, and the coil voltages respectively of three phases are produced symmetrically on both sides of the DC power supply Vco and ground GND in relation to the voltage Vm. Therefore, the voltages $Vl_1$ and $Vl_2$ shown in FIG. 3 become equal to each other, and from the Eqs. (4-10) and (4-11) above, the following equation is obtained:

$$0 = Vco - 2Vm - Vces_7 - Vbe_1 + Vce_5 + Im \cdot Rs$$
$$Vces_5 = 2Vm + Vces_7 + Vbe_1 - Im \cdot Rs - Vco \quad (4\text{-}12)$$

Substitution of Eq. (4-1) into Eq. (4-12) gives:

$$(4\text{-}13)$$
$$Vces_5 = Vco - Vf + Im \cdot Rs + Vces_7 + Vbe_1 - Im \cdot Rs - Vco$$
$$= Vces_7 + Vbe_1 - Vf$$

where Vf is a forward voltage drop across a diode. If the voltage $Vbe_1$ and the voltage drop Vf are cancelled on the assumption that they are nearly equal to each other, say, as $Vbe_1 \approx Vf$, it follows that the equation is:

$$Vces_5 = Vces_7 \quad (4\text{-}14)$$

This means that the collector-emitter voltage of transistor $Q_5$ is also held substantially equal to $Vces_7$ by the action of the aforementioned coil midrange feedback loop, and consequently, the saturation of the transistor $Q_5$ is also prevented, though not so highly accurate as in the case of the transistor $Q_7$.

While having described the saturation detector circuit $d_1$ corresponding to one phase and only limited timing it is to be understood that the other saturation detector circuits $d_2$ and $d_3$ in the other phases operate in exactly the same manner as described above and are effective for all timing at which the motor revolves.

Thus, according to the FIG. 1 embodiment, the value and temperature coefficient of resistor $R_1$ serve to provide a means for generating the reference voltage, and once such data is set at a predetermined value, saturation of the first transistor $Q_7$ and the power transistor $Q_5$ on the ground side can be properly prevented regardless of their collector currents and ambient temperature.

Moreover, the resistors, which are formed by semiconductors, usually have a positive temperature coefficient close to the saturation voltage of transistors, and hence are advantageous in that no temperature compensation is required in the case of fabricating the circuit of the above embodiment into an integrated circuit (IC). Furthermore, the resistors permit their degrees of saturation, including their unsaturated state, to be selectively set by adjusting the value of the resistor $R_1$, and also permit a certain rough setting of such resistor value by virtue of the foregoing saturation degrees being not so changeable therewith.

In still further advantageous aspect, the reference voltage ($i_1 \cdot R_1$) for the detection of saturation is set independently for each phase, which makes small the difference in saturation preventing effect among the respective phases, and since the prevention of transistor saturation is not directed to the transistors for supplying power to each driving coil, each of them does not solely generate heat. This allows temperature compensation to each.

Next, a description will be given of various modified forms of the invention.

Figure 4:
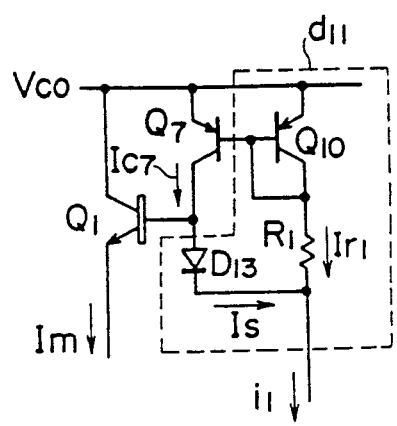
FIG. 4 is a circuit diagram illustrating a modified form of a saturation detecting circuit which is applicable to the present invention.

FIG. 4 illustrates a saturation detector circuit $d_{11}$ formed by using a diode $D_{13}$ in place of the transistor $Q_{13}$ serving as the current feedback means in the FIG. 1 embodiment. Of course, similarly modified are the other saturation detector circuits for the other coils. In this embodiment, the diode $D_{13}$ is conducted in the vicinity of the saturation point of the first transistor $Q_7$ and a portion of the collector current $Ic_7$ of the transistor $Q_7$ is provided as the saturation detected current Is to the diode $D_{13}$ and the current Is is entirely returned to the inflow current $i_1$ of the saturation detector circuit $d_{11}$. In this way, the saturation of the transistor $Q_7$ is prevented. Otherwise stated, when the control voltage $Vct_1$ rises and the current $i_1$ increases, the current $Ir_1$ across the resistor $R_1$ serving as the reference voltage generating means is not so much increased by the inflow of the saturation detected current Is thereinto, and an increase of the motor current Im is also stopped, and consequently, the collector-emitter voltage $Vce_7$ of the transistor $Q_7$ no longer decreases. The voltage $Vce_7$ at this moment is expressed as follows:

$$Vce_7 = Ir_1 \cdot R_1 \qquad (5\text{-}1)$$

As similar to the FIG. 1 embodiment, in the case of setting the minimum value of the voltage $Vce_7$ to the very limit of the saturation voltage, the Eq. (4-8) should be used to obtain the following equations:

$$K_7 \cdot Ic_7 = Ir_1 \cdot R_1 \quad R_1 = K_7(Ic_7/Ir_1) \qquad (5\text{-}2)$$

The ratio $Ic_7/Ir_1$ in this Eq. (5-2) is also the input/output current ratio of the current mirror circuit formed by the transistors $Q_{10}$ and $Q_7$. By setting the resistor $R_1$ to a predetermined value, the saturation of the transistor $Q_7$ can be prevented as in the FIG. 1 embodiment.

Figure 5:
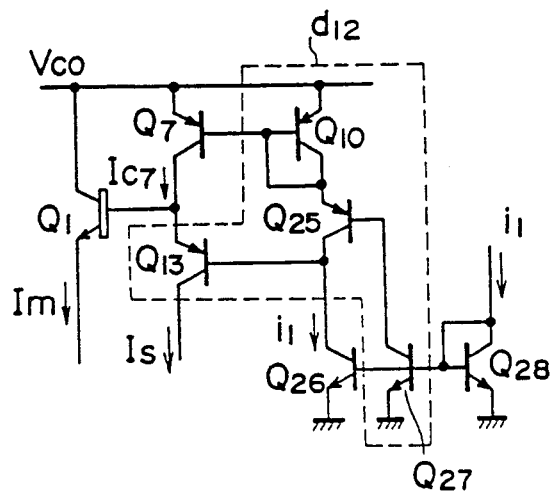
FIG. 5 is a circuit diagram illustrating another modification of the saturation detecting circuit applicable to the present invention.
Figure 6:
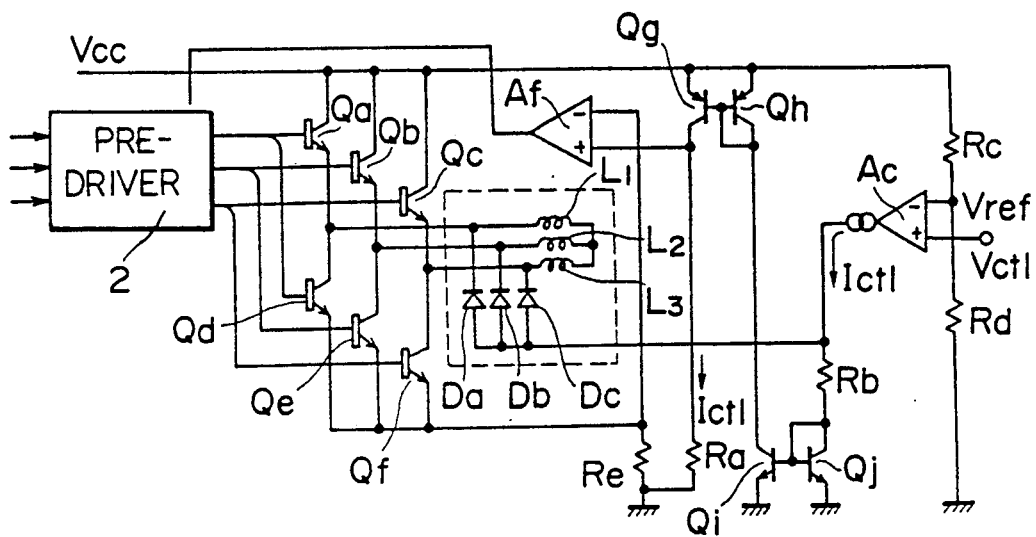
FIG. 6 is a circuit diagram showing an example of a conventional brushless motor drive circuit.
Figure 7:
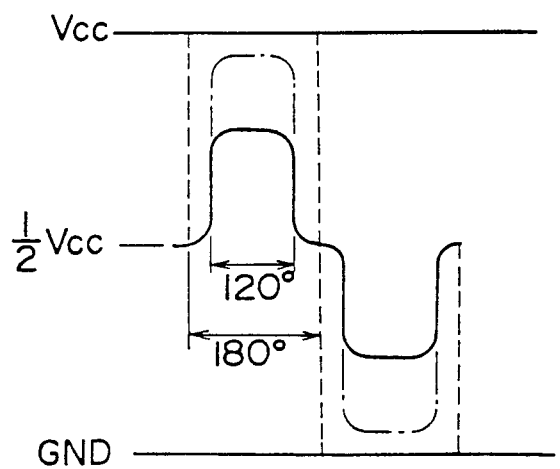
FIG. 7 is a waveform diagram showing an example of a 120° soft switching waveform.

FIG. 5 illustrates a saturation detector circuit $d_{12}$ in which a transistor $Q_{25}$ is employed in place of the resistor $R_1$ which serves as the reference voltage generating means in the embodiment of FIG. 1. In this particular embodiment, the other saturation detector circuits the other phases are similarly modified as well. As shown, the collector of a transistor $Q_{26}$, which is a first output of a current mirror circuit composed of three transistors $Q_{26}$, $Q_{27}$ and $Q_{28}$, is connected to the collector of the transistor $Q_{25}$, whereas the collector of the transistor $Q_{27}$, which is a second output of the current mirror circuit, is connected to the base of the transistor $Q_{25}$. The current ratio between those first and second output transistors is set such that the transistor $Q_{25}$ is completely saturated. Thus, the present embodiment in FIG. 5 is exactly identical in operation with the FIG. 1 embodiment above, except that the former utilizes a voltage drop across the transistor $Q_{25}$ in place of the voltage drop across the resistor $R_1$ in the latter.

Letting the saturation voltage of the transistor $Q_{25}$ be represented by $Vces_{25}$, the collector-emitter voltage $Vce_7$ of the transistor $Q_7$ at the time of conducting the transistor $Q_{13}$ is expressed as follows:

$$Vce_7 = Vces_{25} \qquad (5\text{-}3)$$

Similarly to the FIG. 1 embodiment, in the case of setting the minimum value of the voltage $Vce_7$ to the very limit of the saturation voltage the foregoing, Eq. (4-8) should be used to obtain the following equation:

$$K_7 \cdot Ic_7 = Vces_{25} \qquad (5\text{-}4)$$

Letting the proportional constant of saturation voltage corresponding to the collector current ($Ic_{25} = i_1$) of the transistor $Q_{25}$ be represented by $K_{25}$, it follows that:

$$Vces_{25} = K_{25} \cdot i_i \qquad (5\text{-}5)$$

Substitution of Eq. (5-5) into Eq. (5-4) gives:

$$K_7 \cdot Ic_7 = K_{25} \cdot i_1 \quad K_{25} = K_7(Ic_7/I_1) \qquad (5\text{-}6)$$

The ratio $Ic_7/i_1$ in this Eq. (5-6) is also the input/output current ratio of the current mirror circuit composed of the transistors $Q_{10}$ and $Q_7$ in FIG. 5. Setting the ratio between the proportional constants $K_{25}$ and $K_7$ to a predetermined value permits for preventing the saturation of the transistor $Q_{25}$ as with the FIG. 1 embodiment. Such ratio between $K_{25}$ and $K_7$ can be set as desired by setting an area ratio between the transistors $Q_{25}$ and $Q_7$. Further, advantageously, the $K_{25}$ and $K_7$ have the same temperature coefficient in common, and there is no need to make any temperature compensation in the present embodiment.

While the above description has been made of preferred embodiments of the present invention, the invention is not limited thereto and various modifications may be effected without departing from the gist and claimed nature of the invention. For instance, in the embodiment of FIG. 1, the transistor $Q_{20}$ may be omitted so that the saturation detected current Is is provided directly to the base of the transistor $Q_{21}$, and the collector of the transistor $Q_{21}$ may be connected directly to the plus input of the current feedback amplifier Af, instead of to the plus input of the control amplifier Ac. The illustrated embodiments may be used in combination, and being not limited to the three phase two-way power supply, the present invention is applicable to one-way power supply and drive circuits for brushless motors regardless of the number phases used. In the illustrated embodiments the transistors are shown to be bipolar transistors, but instead thereof, FETs (filed effect transistors) may also be employed. Moreover, the present invention is applicable not only to a brushless motor with a sensor but also to the one without the sensor.

I claim:

1. A brushless motor drive circuit which is provided with a plurality of output transistors for switching a DC power supply to driving coils of m phases, comprising that, for each phase, there are provided:

a first transistor for driving a corresponding one of said output transistors connected to a DC power supply side;

a second transistor which constitutes a current mirror circuit in combination with said first transistor;

a reference voltage generating means connected to said second transistor, said means for generating a voltage proportional to a current flowing through said second transistor; and a current feedback means which is to be turned on when a potential difference between an output terminal of said first transistor and said DC power supply reaches a value close to said voltage generated by said reference voltage generating means; said current feedback means causing a voltage drop nearly equal to a voltage generated by said second transistor, to thereby feed back a portion of an output current of said first transistor to a stage preceding said reference voltage generating means, so that an input current to said first transistor is reduced.

2. The brushless motor drive circuit according to claim 1, which further comprises a coil midrange voltage detector for detecting midrange voltages of said driving coils of the respective phases, said coil midrange voltage detector being connected with said driving coils, and a midrange feedback amplifier for feeding back and bringing said driving coil midrange voltages to a level equal to a coil midrange reference voltage.

3. The brushless motor drive circuit according to claim 1, wherein said reference voltage generating means includes a resistor.

4. The brushless motor drive circuit according to claim 1, wherein said reference voltage generating means includes a transistor.

5. The brushless motor drive circuit according to claim 1, wherein said current feedback means includes a transistor.

6. The brushless motor drive circuit according to claim 1, wherein said current feedback means includes a diode.

7. The brushless motor drive circuit according to claim 1, wherein said transistors are field effect transistors.

* * * * *